(12) United States Patent
Khalil et al.

(10) Patent No.: US 12,556,126 B2
(45) Date of Patent: Feb. 17, 2026

(54) SYNCHRONOUS ELECTRIC MACHINES SELF-SENSING FAULT DETECTION

(71) Applicant: Caterpillar Inc., Peoria, IL (US)

(72) Inventors: Ahmed Khalil, Dunlap, IL (US); Jackson Wai, Dunlap, IL (US); Sajan Abdul, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 311 days.

(21) Appl. No.: 18/496,175

(22) Filed: Oct. 27, 2023

(65) Prior Publication Data

US 2025/0141391 A1    May 1, 2025

(51) Int. Cl.
  *H02P 1/26* (2006.01)
  *B60L 15/00* (2006.01)
  *H02P 23/14* (2006.01)
  *H02P 29/032* (2016.01)

(52) U.S. Cl.
  CPC .......... *H02P 29/032* (2016.02); *B60L 15/007* (2013.01); *H02P 23/14* (2013.01); *B60L 2220/14* (2013.01); *H02P 2205/03* (2013.01)

(58) Field of Classification Search
  CPC .......... H02P 1/26; H02P 29/032; H02P 23/14; F03D 7/0272; B60L 15/007; B60L 2220/14
  See application file for complete search history.

(56) References Cited

U.S. PATENT DOCUMENTS

| 8,185,342 B2 | 5/2012 | Yeh et al. |
| 8,796,979 B2 | 8/2014 | Oh |
| 2004/0119292 A1* | 6/2004 | Datta .................... F03D 7/0272 290/44 |
| 2008/0018292 A1* | 1/2008 | Bixel ........................ H02P 1/26 318/779 |
| 2022/0365137 A1 | 11/2022 | Manson et al. |

FOREIGN PATENT DOCUMENTS

| CN | 106059436 | 8/2018 |
| CN | 106059435 | 12/2018 |
| CN | 115313935 | 11/2022 |
| DE | 102016224056 | 6/2017 |
| KR | 101394556 | 5/2014 |

* cited by examiner

*Primary Examiner* — Cortez M Cook

(57) ABSTRACT

Techniques are described to continuously calculate an inverter DC power of a synchronous machine, e.g., motor or generator, based on the individual phase currents, DC link voltage, and gate signals, which can be compared against the commanded mechanical power based of the estimated rotor speed and commanded torque. A controller can determine whether to shut down the inverter, such as the pulse width modulation (PWM), if the DC power is greater than a threshold value. Such a threshold can be defined to allow an acceptable position and speed estimation error margin.

20 Claims, 5 Drawing Sheets

SYNCHRONOUS ELECTRIC MACHINES SELF-SENSING FAULT DETECTION

TECHNICAL FIELD

This disclosure relates generally to a control system and, more particularly, to a control system for a synchronous machine.

BACKGROUND

Rotor position and speed sensing in synchronous machines are pivotal components in determining the operational parameters and performance characteristics of the machine. Precise rotor position information is crucial for achieving optimal control and performance, especially in applications involving high dynamics and varying load conditions. Accurate rotor position sensing is vital for the proper commutation of currents, which can affect the torque production, efficiency, and overall reliability of the machine. Moreover, the correct detection of rotor speed is imperative for maintaining synchronous operation and ensuring the stability of the machine under varying load conditions. This is especially relevant in systems like electric vehicles and renewable energy applications, where rapid changes in operating conditions and load demands necessitate real-time adjustment of control strategies based on accurate rotor position and speed information.

KR101394556B1 relates to an apparatus and a method for detecting malfunctions of a rotor position sensor of a permanent magnet synchronous motor, and comprises: a position estimation unit for estimating a position of a motor by receiving voltage, current, and speed information of the motor; an actual position detection unit for detecting an actual position of the motor from a position sensor; a residual calculation unit for calculating residual from a difference between the estimation value and the actual position value; an adaptive threshold value calculation unit for calculating an adaptive threshold value according to a driving condition of the motor; and a malfunction determination unit for determining the malfunction of the motor by comparing the residual with the adaptive threshold value. The present invention can minimize error detection with distortion or modeling error by determining the malfunctions by the size of the residual value by applying the adaptive threshold value to the rotor position sensor of PMSM.

SUMMARY

This disclosure describes techniques to continuously calculate an inverter DC power of a synchronous machine, e.g., motor or generator, based on the individual phase currents, DC link voltage, and gate signals, which can be compared against the commanded mechanical power based of the estimated rotor speed and commanded torque. A controller can determine whether to shut down the inverter, such as the pulse width modulation (PWM), if the DC power is greater than a threshold value. Such a threshold can be defined to allow an acceptable position and speed estimation error margin.

In some aspects, this disclosure is directed to a control system for a synchronous machine having a stator and a rotor, the control system comprising: an inverter circuit configured to be coupled between the stator and a common bus, wherein the common bus is configured to be coupled with an electrical load; a controller configured for: determining an inverter DC power value based on a voltage of the common bus and a current of the common bus; determining a power command value based on an estimated rotational speed of the rotor and a commanded torque value; comparing the determined inverter DC power value and the determined power command value to a threshold value; and determining whether to turn off the inverter circuit based on the comparison.

In some aspects, this disclosure is directed to a method of controlling a synchronous machine having a stator, a rotor, and controlled by an inverter circuit coupled between the stator and a common bus, wherein the common bus is coupled with an electrical load, the method comprising: determining an inverter DC power value based on a voltage of the common bus and a current of the common bus; determining a power command value based on an estimated rotational speed of the rotor and a commanded torque value; comparing the determined inverter DC power value and the determined power command value to a threshold value; and determining whether to turn off the inverter circuit based on the comparison.

In some aspects, this disclosure is directed to a vehicle having a synchronous machine having a stator and a rotor, the vehicle comprising: a traction system mechanically coupled to the synchronous machine; an inverter circuit configured to be coupled between the stator and a common bus, wherein the common bus is configured to be coupled with an electrical load; a controller configured for: determining an inverter DC power value based on a voltage of the common bus and a current of the common bus; determining a power command value based on an estimated rotational speed of the rotor and a commanded torque value; comparing the determined inverter DC power value and the determined power command value to a threshold value; and determining whether to turn off the inverter circuit based on the comparison.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

The practical implementation of rotor position and speed sensing can have challenges. Real-world conditions such as sensor noise, signal interference, temperature variations, and mechanical misalignments can potentially result in deviations between the estimated and actual rotor position and speed. To mitigate these challenges, advanced self-sensing algorithms are developed. These algorithms leverage mathematical models and signal processing techniques to estimate rotor position and speed with minimal reliance on physical sensors, reducing vulnerability to sensor faults and failures.

However, the reliability of these self-sensing methods hinges on their ability to detect any deviations in rotor position and speed estimations promptly and correct them, ensuring the sustained operational integrity of synchronous machines. The present inventors have recognized a need for a robust method to detect any potential rotor speed and position estimation deviation compared to the actual electric machine's operating position and speed. Robust detection and correction mechanisms are essential to prevent the propagation of errors, which could lead to suboptimal performance, increased wear and tear, and even catastrophic failure of the machine.

This disclosure describes techniques to continuously calculate an inverter DC power of a synchronous machine, e.g., motor or generator, based on the individual phase currents, DC link voltage, and gate signals, which can be compared against the commanded mechanical power based of the estimated rotor speed and commanded torque. A controller can determine whether to shut down the inverter, such as the pulse width modulation (PWM), if the DC power is greater than a threshold value. Such a threshold can be defined to allow an acceptable position and speed estimation error margin.

Figure 1:
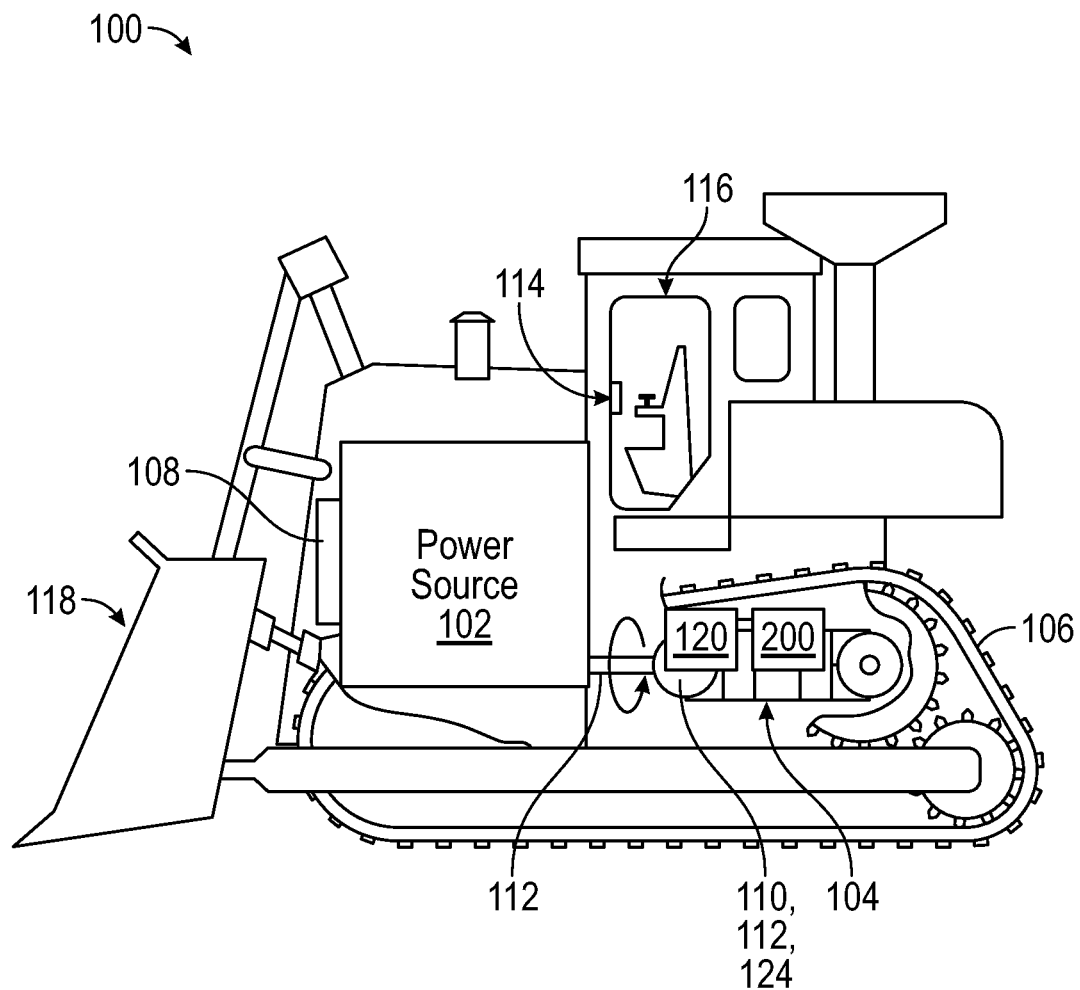
FIG. 1 is a diagram of an example of a vehicle 100 that includes a synchronous machine.

FIG. 1 is a diagram of an example of a vehicle 100 that includes a synchronous machine. The vehicle 100 is shown as a track type tractor but can include any type of machine that includes a synchronous machine.

As shown, the vehicle 100 can have a power source 102, an electric drive system 104, a traction system 106, an inverter circuit 108, a synchronous machine 110, and a drive shaft 112. The power source 102 is configured to supply power to the vehicle 100. In some implementations, the power source 102 can be a direct current (DC) power source, such as a fuel cell. Examples of fuel cells include lithium-ion batteries or other rechargeable batteries having one or more battery cells, and one or more capacitors, e.g., ultra capacitors. In other implementations, the power source 102 can be an engine, such as a diesel engine. The power source 102 can be operably arranged to receive control signals from operator controls 114 in operator station 116. Additionally, the power source 102 can be operably arranged with the electric drive system 104 and/or an implement 118 to selectively operate the electric drive system 104 and/or the implement 118 according to control signals received from the operator controls 114. The power source 102 can provide operating power for the propulsion of the electric drive system 104 and/or the operation of the implement 118 via, for example, the electric drive system 104, the inverter circuit 108, the synchronous machine 110, the drive shaft 112, and/or the like.

The electric drive system 104 can be operably arranged with the power source 102 to selectively propel the vehicle 100 via control signals from the operator controls 114. The electric drive system 104 can be operably connected to a plurality of ground-engaging members, such as traction system 106, as shown, which can be movably connected to the vehicle 100 through axles, drive shafts, a transmission, and/or other components and which can be movably connected to the electric drive system 104 via the synchronous machine 110 and the drive shaft 112. In some implementations, the traction system 106 can be provided in the form of a track-drive system, a wheel-drive system, or any other type of drive system configured to propel the vehicle 100. In some implementations, the electric drive system 104 can be operably arranged with power source 102 to selectively operate the implement 118, which can be movably connected to the vehicle 100 and to the electric drive system 104. The traction system 106 can be mechanically coupled with the synchronous machine 110.

The inverter circuit 108 can be electrically connected to the power source 102 and/or the electric drive system 104. In some implementations, the inverter circuit 108 can receive a DC current from the power source 102 and can control a phase of the DC current to provide an AC current to the synchronous machine 110. Additionally, or alternatively, the inverter circuit 108 can provide the AC current to a generator. In this way, the inverter circuit 108 can provide operating power for the propulsion of the vehicle 100 and/or the operation of the implement 118.

The synchronous machine 110 can be electrically coupled to a sensor 120, which can provide feedback to a control system to enable control of the inverter circuit 108, the synchronous machine 110, and/or the like. For example, the sensor 120 can be a current sensor that provides information identifying a set of currents associated with a set of phases of current provided from the inverter circuit 108 to the synchronous machine 110. The synchronous machine 110 can include a rotor 122 and a stator 124. Based on the sensor 120 providing feedback to the control system, the control system can determine an estimated angular position (e.g., a relative position) of the rotor 122 and the stator 124 to enable the control system to control the inverter circuit 108, the synchronous machine 110, and/or the like.

The implement 118 can be operably arranged with the electric drive system 104 such that the implement 118 is selectively movable through control signals transmitted from the operator controls 114 to the electric drive system 104, the inverter circuit 108, the synchronous machine 110, the drive shaft 112, and/or the like. The illustrated implement 118 is a tractor loader. Other embodiments can include any other suitable implement for a variety of tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

In some examples, the techniques of this disclosure can be implemented with the synchronous machine 110 of FIG. 1.

Figure 2:
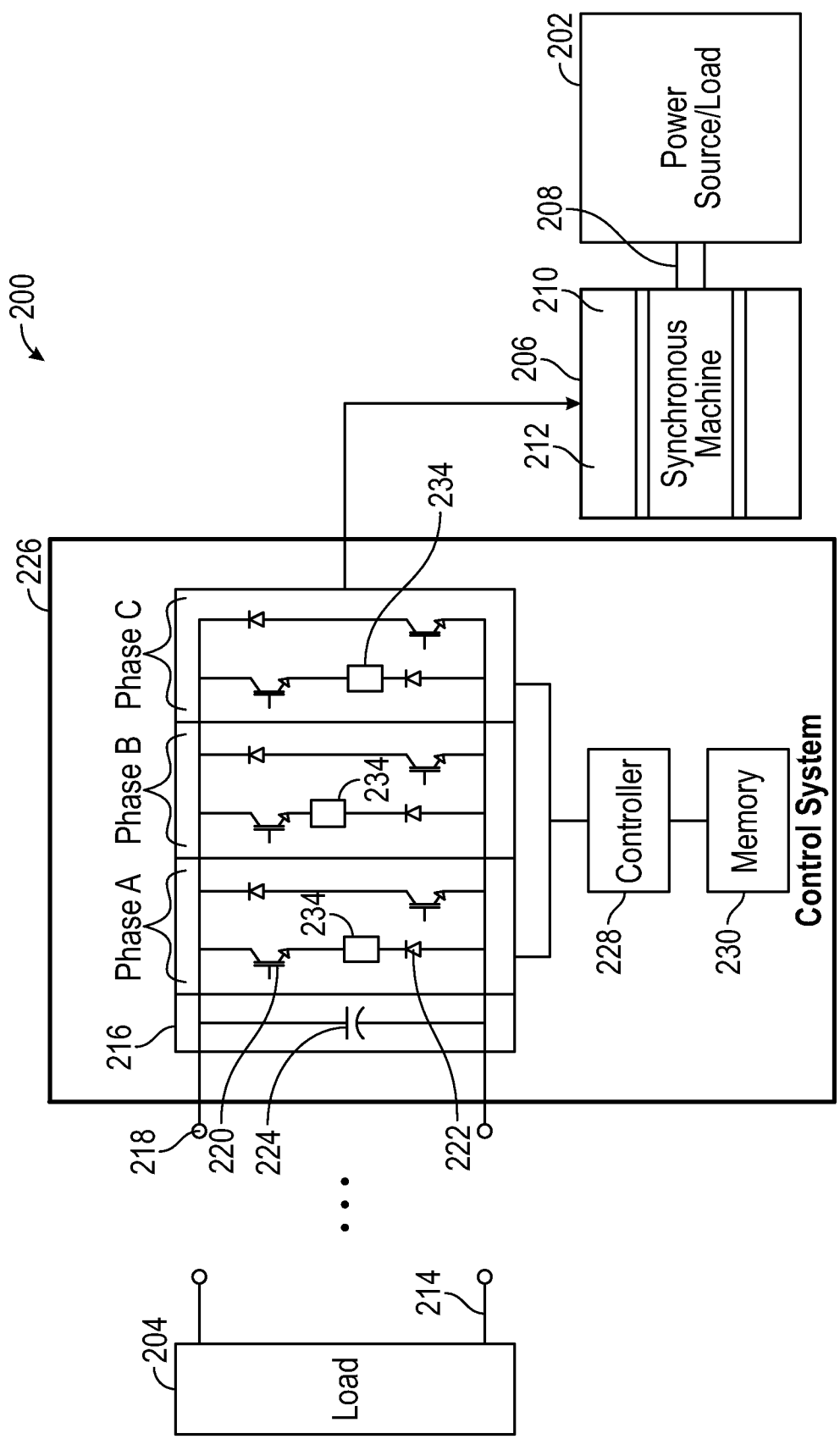
FIG. 2 is a schematic view of an example of an electric drive with a control system for controlling a synchronous machine in accordance with this disclosure.

FIG. 2 is a schematic view of an example of an electric drive with a control system for controlling a synchronous machine in accordance with this disclosure. An example of an electric drive 200 that can be used to provide power between a primary power source 202 and one or more electrical loads 204 is illustrated. The primary power source 202 can include a diesel engine, a gasoline engine, a natural gas engine, or any other source of mechanical or rotational energy commonly used in association with mobile tools, industrial machines, and the like. The primary power source 202 can alternatively include power sources commonly used in conjunction with stationary applications, such as windmills, hydro-electric dams, batteries, fuel cells, or any other suitable source of energy. The electrical loads 204 can include one or more devices or components which consume and/or employ electrical power provided thereto by the electric drive 200. For example, with respect to industrial work machines or mobile work vehicles, the electrical loads 204 can include one or more motors for operating tools of the machine and/or one or more traction motors for causing motion of the associated vehicle.

Mechanical energy that is supplied by the primary power source 202 can be converted into electrical power by the electric drive 200 for use by the connected electrical loads 204. Conversely, any electrical power that can be supplied by the electrical loads 204 and/or the electric drive 200 can be supplied to drive mechanical power to the primary power source 202. As shown in FIG. 2, for example, the electric drive 200 can communicate with the primary power source 202 through a synchronous machine 206, or the like. The synchronous machine 206 can include a rotor 210 that is rotatably disposed within a fixed stator 212. The rotor 210 of the synchronous machine 206 can be rigidly and rotatably coupled to an output of the primary power source 202 via a coupling 208, or in other embodiments, via a direct crankshaft, a gear train, a hydraulic circuit, or the like. Each phase or phase winding of the stator 212 of the synchronous machine 206 can be electrically coupled to a common bus 214 of the electric drive 200 via an inverter circuit 216.

During a generating mode of operation, as the rotor 210 of the synchronous machine 206 is rotated within the stator 212 by the primary power source 202, electrical current can be induced within the stator 212 and supplied to the inverter circuit 216. The inverter circuit 216 can in turn convert the electrical signals into the appropriate direct current (DC) voltage for distribution to the electrical load 204 and/or any other device via the common bus 214. The common bus 214 can provide terminals 218, such as positive and negative or ground lines, across which the common bus 214 can communicate a bus voltage or DC link voltage between one or more electrically parallel devices of the electric drive 200.

The electrical load 204 can include circuitry for converting the DC voltage supplied by the inverter circuit 216 into the appropriate electrical signals for operating any one or more devices associated with the electric drive 200. Additionally, during a motoring mode of operation, or when the electrical load 204 become the sink of electrical power, the synchronous machine 206 can be enabled to cause rotation of the rotor 210 in response to electrical signals that are provided to the stator 212 from the common bus 214.

As shown in FIG. 2, the inverter circuit 216 can include a series of transistors 220 (e.g., gated switches) and diodes 222 for selectively enabling one or more phase windings or phases of the synchronous machine 206. A three-phase synchronous machine 206, for example, can be driven using an inverter circuit 216 with six transistors 220 and six diode 222 for selectively enabling or disabling each of the three phases of the synchronous machine 206. Each of the transistor 220 can further be enabled or disabled via gate signals while an external or secondary power source 224 provides power across the positive and negative terminals 218 of the common bus 214 to force current through the respectively enabled transistors 220 and diodes 222. The electric drive 200 can also be provided with a control system 226 configured to, among other things, determine the position of the rotor 210 of the synchronous machine 206 relative to the stator 212 and control operation of the synchronous machine 206 based on the determined rotor position.

As illustrated in FIG. 2, the control system 226 can generally include the inverter circuit 216, at least one controller 228 in communication with the transistors 220 of the inverter circuit 216, as well as a memory 230 in communication with the controller 228 that is provided within and/or external to the controller 228. More particularly, the controller 228 can be electrically coupled to the transistors 220 in a manner which enables the controller 228 to selectively engage the transistors 220 and source current through the different phases of the synchronous machine 206, as well as in a manner which enables the controller 228 to monitor electrical characteristics of the synchronous machine 206 and the bus or DC link voltage of the common bus 214 during operation of the synchronous machine 206. The memory 230 can retrievably store one or more algorithms, machine data, predefined relationships between different machine parameters, preprogrammed models, such as in the form of lookup tables and/or maps, or any other information that can be accessed by the controller 228 and relevant to the operation of the synchronous machine 206.

The controller 228 of FIG. 2 can be implemented using one or more of a processor, a microprocessor, a microcontroller, a digital signal processor (DSP), a field-programmable gate array (FPGA), an electronic control module (ECM), an electronic control unit (ECU), or any other suitable means for electronically controlling functionality of the control system 226. The controller 228 can be configured to operate according to predetermined algorithms or sets of instructions for operating the electric drive 200 and the synchronous machine 206 based on the rotational speed and/or position of the rotor 210 relative to the stator 212 or other operating characteristics of the electric drive 200. Such algorithms or sets of instructions can be preprogrammed or incorporated into memory 230 that is associated with or at least accessible to the controller 228 as is commonly used in the art.

Figure 3:
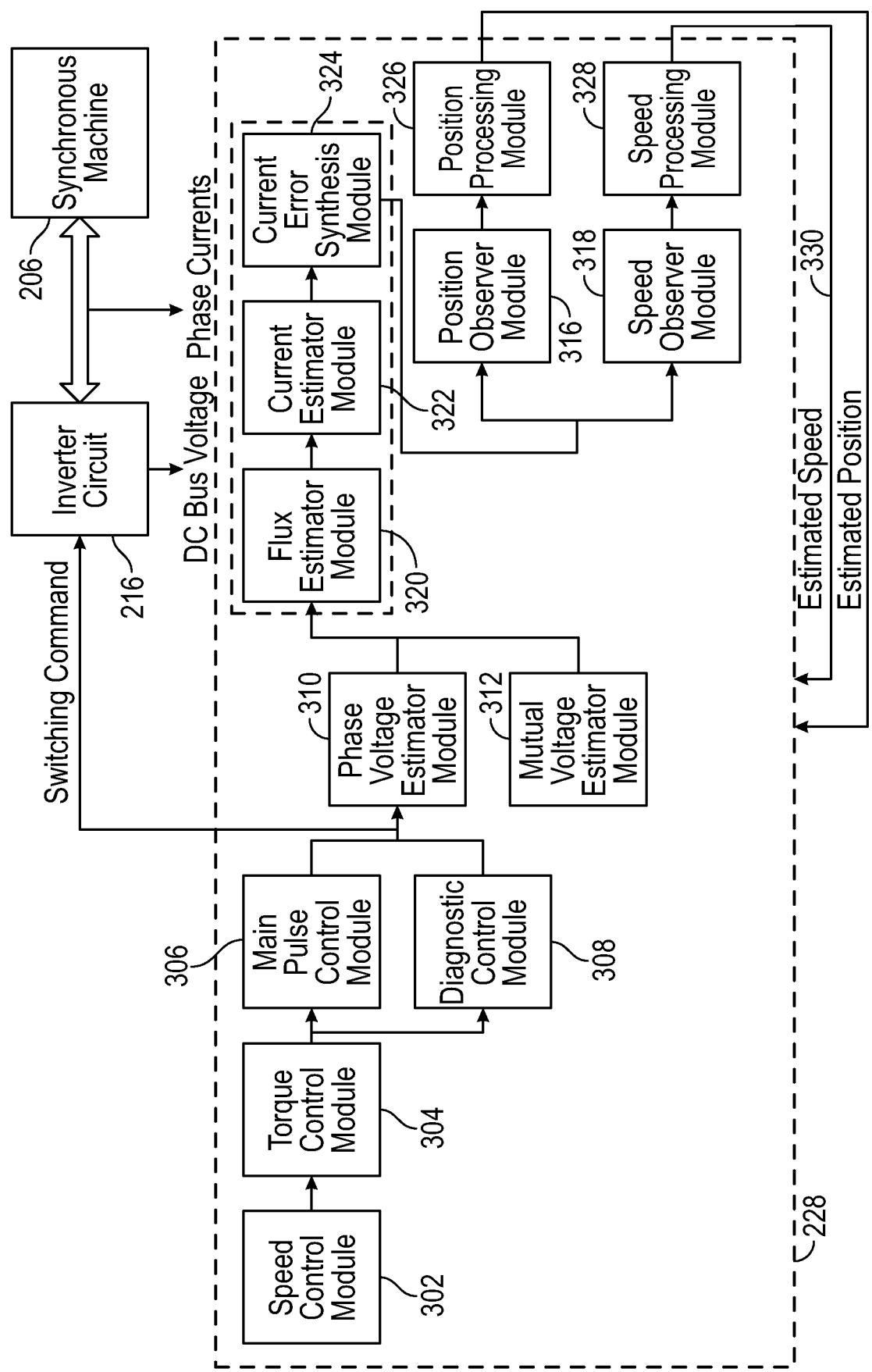
FIG. 3 is a diagrammatic view of an example of a control scheme to be implemented by a controller for operating a synchronous machine using various techniques of this disclosure.

FIG. 3 is a diagrammatic view of an example of a control scheme to be implemented by a controller for operating a synchronous machine using various techniques of this disclosure. As shown in FIG. 3, the controller 228 can be configured to include a speed control module 302, a torque control module 304 and a main pulse control module 306. Specifically, the speed control module 302 can be configured to determine the desired or target speed of the synchronous machine 206 based on any combination of operator input, machine input parameters or constraints, automated controls, and the like. In turn, the torque control module 304 can be configured to determine the target output torque of the synchronous machine 206, which corresponds to achieving the target speed determined by the speed control module 302. The main pulse control module 306 can be configured to generate or use the switching command, or the sequence of pulses or current signals designed to selectively enable the transistors 220 of the converter circuit 116, to operate the synchronous machine 206 according to the target output torque or speed.

While the main pulse control module 306 can be suited for use with high speed operating modes or relatively high operating speeds of the synchronous machine 206, low speed operating modes or relatively low operating speeds of the synchronous machine 206 can be managed by a diagnostic pulse control module 308, as shown in FIG. 3. In particular, high speed operating modes can involve operating speeds that are higher than or inclusive of a nominal or base speed, while low speed operating modes can involve operating speeds that are zero or lower than the base speed. Although base speeds can vary per application, base speeds can generally be defined as the maximum speed at which the synchronous machine 206 is able to output constant torque and before torque output begins to decrease proportionally in relation to the operating speed.

The diagnostic pulse control module 308 of the controller 228 can be disposed in parallel to the main pulse control module 306. The diagnostic pulse control module 308 can be configured to generate and inject diagnostic or test pulses into each idle phase of the stator 212 or phases that are not controlling the synchronous machine 206 at a given instance. Moreover, the diagnostic pulses can selectively enable the corresponding transistors 220 of the inverter circuit 216 and drive a phase current with a substantially constant current height through each idle phase of the stator 212, so as to facilitate computations to be performed later. Furthermore, the diagnostic pulse control module 308 can be configured to generate and inject the test pulse into idle phases according to the most recently assessed or estimated rotor position.

As demonstrated by the architecture of the controller 228 in FIG. 3, processes that are applied to either the main pulses or the diagnostic pulses are streamlined into a single algorithm or sequence of instructions. Moreover, the entire range of operating speeds of the synchronous machine 206, for instance, both high speed and low speed operating modes, which previously required two or more distinct algorithms or process groups, can be managed by the unified algorithm or set of processes of FIG. 3 to not only reduce complexity, but also to spare significant computational resources. For example, either the main pulse during relatively high speed operations, or the diagnostic pulse during relatively low speed operations can be processed by the controller 228 in substantially the same manner to assess rotor position and/or rotor speed. At even higher or very high speeds, the main pulse control module 306 will likely shift between a discontinuous conduction mode (DCM) and a continuous conduction current mode (CCM) to satisfy certain power requirements. Based on the sensorless architecture and techniques disclosed herein, rotor position and speed estimation can also be possible at such high speeds and during CCM modes of operation.

To determine rotor position or rotor speed, the controller 228 of FIG. 3 can initially provide a phase voltage estimator module 310 configured to determine the voltage of the phase or phase voltage based on either the main pulse or the diagnostic pulse and known electrical properties between phase voltage and phase current for the given synchronous machine 206. The controller 228 can further include a mutual voltage estimator module 312 configured to determine the associated mutual voltage, for instance, with reference to one or more preprogrammed lookup tables, maps, or the like, which predefine relationships between mutual voltage values, phase current values, estimated rotor position values, and the like. Furthermore, the controller 228 can apply the phase voltage and the mutual voltage, and any suitable calculation, computation, derivation and/or manipulation thereof, as inputs to a position observer module 316 to determine rotor position and to a speed observer module 318 to determine rotor speed as shown in FIG. 3.

While other manipulations or derivations based on the phase voltage and the mutual voltage will be apparent to those of skill in the relevant art, the controller 228 of FIG. 3 can provide a flux estimator module 320 configured to determine an estimated flux based on the phase voltage and the mutual voltage. For example, the flux estimator module 320 can use known electrical properties to determine a total flux based on the determined phase voltage and to determine a mutual flux based on the determined mutual voltage. The flux estimator module 320 can then calculate the estimated flux based on a difference between the total flux and the mutual flux. As shown, the controller 228 can further employ a current estimator module 322 which determines an estimated phase current based on the estimated flux, and a current error synthesis module 324 which determines the error between the estimated phase current and one or more phase currents of the synchronous machine 206. The current error can then be fed into each of the position observer module 316 and the speed observer module 318 to determine the rotor position and the rotor speed, respectively.

The position observer module 316 of FIG. 3 can employ a state observer system which emulates the internal state of a real system, as well as receives input parameters and generates output parameters much like a real system. In the present case, the position observer module 316 can be configured to at least partially emulate a real synchronous machine, receive current error as input, and generate rotor position as output. While the position observer module 316 shown in FIG. 2 can be configured to determine rotor position based on current error, it will be understood that the position observer module 316 can be modified to determine rotor position using other inputs, such as the phase voltage, mutual voltage, estimated flux, phase current, or any other suitable parameter adapted by the controller 228. Optionally, the controller 228 can also provide a position processing module 326 configured to process the output of the position observer module 316 as needed to further refine and/or calibrate the estimated rotor position.

Similar to the position observer module 316, the speed observer module 318 can employ a state observer system to at least partially emulate the internal state of a real synchronous machine, receive current error as input, and generate rotor speed as output. Additionally, although the speed observer module 318 can be configured to determine rotor speed based on current error, the speed observer module 318 can be modified to employ other inputs, such as the phase voltage, mutual voltage, estimated flux, phase current, or any other suitable parameter adapted by the controller 228 to assess rotor speed. In other modifications, the speed observer module 318 can be omitted entirely, and derivations of the rotor position with respect to time can be used to determine rotor speed. However, it will be understood that such indirect estimations of rotor speed can magnify any noise or other errors untreated by the position observer module 316. Furthermore, the controller 228 can optionally include a speed processing module 328 configured to process the output of the speed observer module 318 as needed to further refine and/or calibrate the estimated rotor speed.

Figure 4:
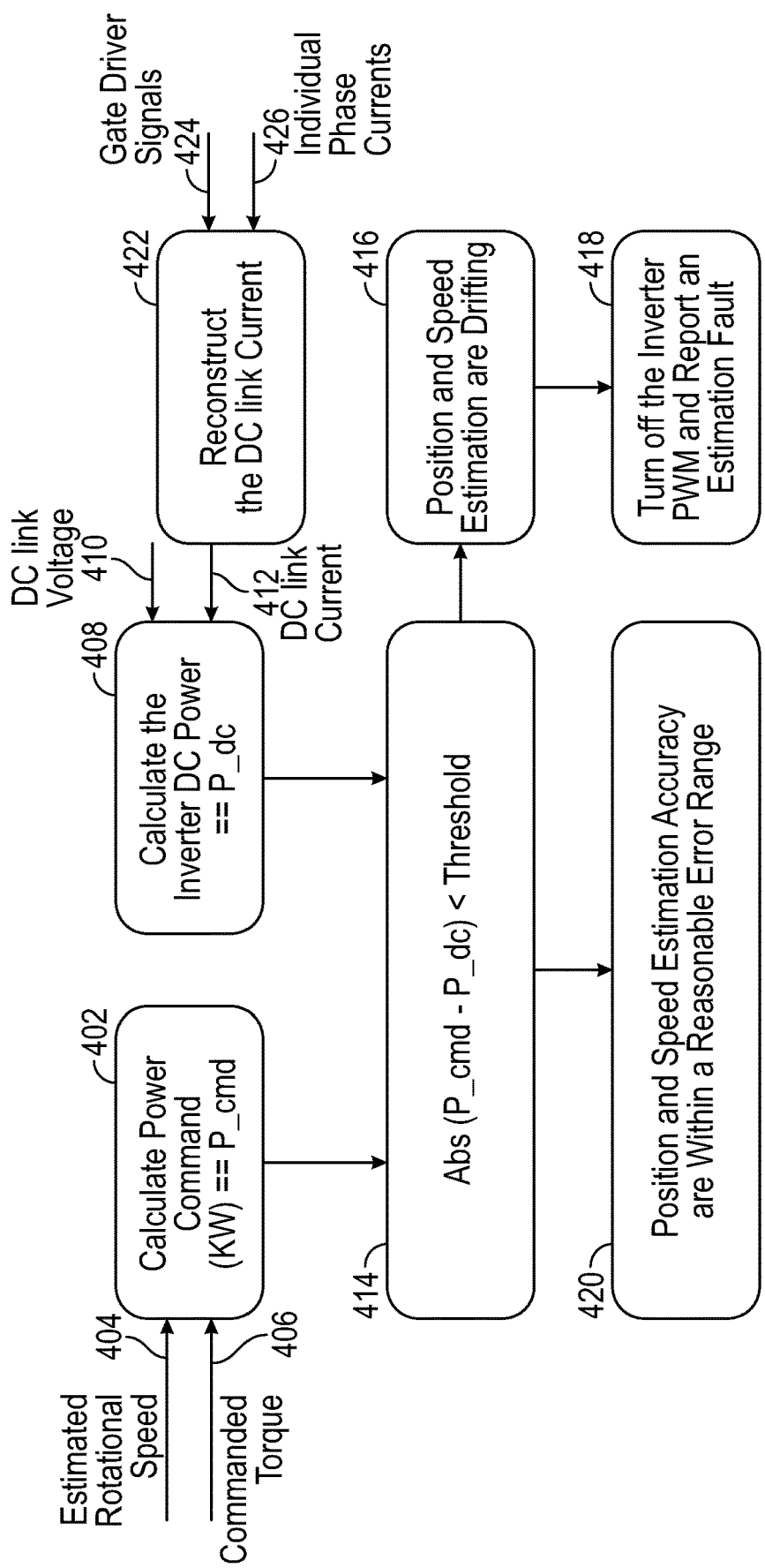
FIG. 4 is an example of a flow diagram for controlling a synchronous machine having a stator and a rotor using various techniques of this disclosure.

FIG. 4 is an example of a flow diagram for controlling a synchronous machine having a stator and a rotor using various techniques of this disclosure. The techniques shown in FIG. 4 can be implemented using the control system 226 of FIG. 2 and, in particular, the controller 228 of FIG. 2 and FIG. 3. In some examples, the techniques of FIG. 4 can be implemented by a control system coupled with the inverter circuit 108 of FIG. 1 to detect any potential rotor speed and position estimation deviation compared to the actual electric machine's operating position and speed.

This disclosure describes techniques to continuously calculate an inverter DC power based on the individual phase currents, DC link voltage, and gate signals, which can be compared against the commanded mechanical power based of the estimated rotor speed and commanded torque. A controller can determine whether to shut down the inverter, such as the pulse width modulation (PWM), if the DC power is greater than a threshold value. Such a threshold would be defined to allow an acceptable position and speed estimation error margin.

At block 402, the controller 228 can calculate or otherwise determine a power command value (P_cmd), such as in kilowatts, based on an estimated rotational speed 404 of the rotor 210 and a commanded torque value 406. The estimated rotational speed 404 can be found using the estimated rotational speed 330 of FIG. 3, which is an output of the speed processing module 328. The commanded torque value is the output of the torque control module 304 of FIG. 3.

At block 408, the controller 228 can calculate or otherwise determine an inverter DC power value (P_dc) based on a voltage of the common bus and a current of the common bus. For example, the controller 228 can determine the inverter DC power value by multiplying the DC link voltage 410 and the DC link current 412. The DC link voltage 410 can be determined using a sensor, for example, such as positioned on the common bus 214. In some implementations, the DC link voltage is a battery voltage. In other implementations, the DC link voltage is generated by a generator, such as mechanically coupled to a diesel engine.

At block 414, the controller 228 can compare the determined inverter DC power value (P_dc) and the determined power command value (P_cmd) to a threshold value. In some examples, the absolute value of the difference between the determined inverter DC power value (P_dc) and the determined power command value (P_cmd) can be compared to a threshold value.

Next, based on the comparison at block 414, the controller 228 can determine whether to turn off the inverter circuit 216. For example, at block 416, when the comparison of the determined inverter DC power value and the determined power command value at block 414 is greater than a threshold value, the controller 228 can determine that a speed and a position of the rotor 210 are drifting. Then, in some examples, at block 418, the controller 228 can output a control signal to turn off the inverter circuit 216, such as turn off pulse width modulation (PWM) signaling, and report an estimation fault, such as to a user.

At block 420, when the comparison of the determined inverter DC power value and the determined power command value at block 414 is less than a threshold value, the controller 228 can determine that a speed and a position of the rotor 210 are within an error range.

In some examples, the DC link current 412, which is the current of the common bus 214 and is used to determine the inverter DC power value (P_dc) at block 408, can be reconstructed, e.g., estimated, by the controller 228 at block 422. For example, the controller 228 can reconstruct, e.g., estimate, the DC link current using the gate driver signals 424, which the controller 228 generates to control the transistors 220, and the individual phase currents 426, such as determined using current transformers or other current sensors 234 positioned with corresponding phases, e.g., phases A, B, C, in FIG. 2.

Figure 5:
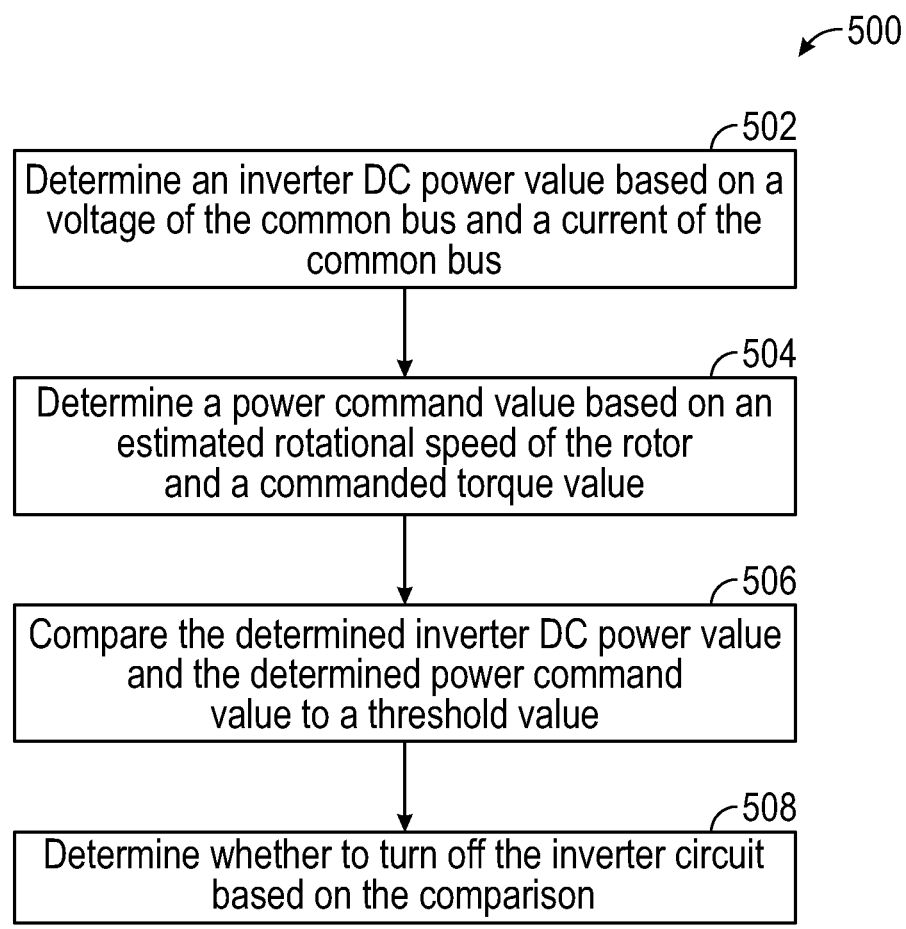
FIG. 5 is a flow chart of an example of a method of controlling a synchronous machine having a stator and a rotor using various techniques of this disclosure.

FIG. 5 is a flow chart of an example of a method 500 of controlling a synchronous machine having a stator and a rotor using various techniques of this disclosure. At block 502, the method 500 determines an inverter DC power value based on a voltage of the common bus and a current of the common bus. For example, the controller 228 of FIG. 2 can reconstruct a current of the common bus, such as by determining the current of the common bus based on a gate driver signal and a phase current.

At block 504, the method 500 determines a power command value based on an estimated rotational speed of the rotor and a commanded torque value.

At block 506, the method 500 compares the determined inverter DC power value and the determined power command value to a threshold value.

At block 508, the method 500 determines whether to turn off the inverter circuit based on the comparison. For example, the controller 228 can determine that a speed and a position of the rotor are drifting when the comparison of the determined inverter DC power value and the determined power command value is greater than a threshold value. Then, the controller 228 can output control signals to turn off pulse width modulation of the inverter circuit and reporting an estimation fault. Or, the controller 228 can determine that a speed and a position of the rotor are within an error range when the comparison of the determined inverter DC power value and the determined power command value is less than a threshold value.

INDUSTRIAL APPLICABILITY

The disclosed technique for continuous monitoring of inverter DC power provide a practical and robust solution to ensure the reliability of self-sensing algorithms for rotor position and speed estimation in synchronous machines. By leveraging readily available signals—phase currents, DC link voltage, gate signals, and commanded torque—the controller can detect excessive deviations between estimated and actual rotor speed and position. Shutting down the inverter when the threshold is exceeded prevents the propagation of errors and potential catastrophic failure.

This continuous validation approach is universally applicable to any self-sensing technique, providing a vital safeguard to enhance real-world performance. The calculations and threshold comparison can be implemented on existing motor drive hardware. With minimal additional computation burden, the invention substantially improves the viability of self-sensing algorithms for industrial applications. By enabling more widespread adoption of self-sensing, the invention reduces overall system complexity and hardware requirements. The practical benefits of avoiding physical sensors susceptible to noise, interference, and other errors justify the industrial applicability of the techniques.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A control system for a synchronous machine having a stator and a rotor, the control system comprising:
   an inverter circuit configured to be coupled between the stator and a common bus, wherein the common bus is configured to be coupled with an electrical load;

a controller configured for:
- determining an inverter DC power value based on a voltage of the common bus and a current of the common bus;
- determining a power command value based on an estimated rotational speed of the rotor and a commanded torque value;
- comparing the determined inverter DC power value and the determined power command value to a threshold value; and
- determining whether to turn off the inverter circuit based on the comparison.

2. The control system of claim 1, wherein the controller configured for determining the inverter DC power value based on the voltage of the common bus and the current of the common bus is configured for:
- reconstructing the current of the common bus.

3. The control system of claim 2, wherein the controller configured for reconstructing the current of the common bus is configured for:
- determining the current of the common bus based on a gate driver signal and a phase current.

4. The control system of claim 1, wherein the controller configured for determining whether to turn off the inverter circuit based on the comparison is configured for:
- determining that a speed and a position of the rotor are drifting when the comparison of the determined inverter DC power value and the determined power command value is greater than the threshold value.

5. The control system of claim 4, wherein the controller is configured for:
- turning off pulse width modulation of the inverter circuit and reporting an estimation fault.

6. The control system of claim 1, wherein the controller configured for determining whether to turn off the inverter circuit based on the comparison is configured for:
- determining that a speed and a position of the rotor are within an error range when the comparison of the determined inverter DC power value and the determined power command value is less than the threshold value.

7. The control system of claim 1, wherein the voltage of the common bus is generated by at least one fuel cell.

8. The control system of claim 7, wherein the at least one fuel cell includes a battery.

9. A method of controlling a synchronous machine having a stator, a rotor, and controlled by an inverter circuit coupled between the stator and a common bus, wherein the common bus is coupled with an electrical load, the method comprising:
- determining an inverter DC power value based on a voltage of the common bus and a current of the common bus;
- determining a power command value based on an estimated rotational speed of the rotor and a commanded torque value;
- comparing the determined inverter DC power value and the determined power command value to a threshold value; and
- determining whether to turn off the inverter circuit based on the comparison.

10. The method of claim 9, wherein determining the inverter DC power value based on the voltage of the common bus and the current of the common bus includes:
- reconstructing the current of the common bus.

11. The method of claim 10, wherein reconstructing the current of the common bus includes:
- determining the current of the common bus based on a gate driver signal and a phase current.

12. The method of claim 9, wherein determining whether to turn off the inverter circuit based on the comparison includes:
- determining that a speed and a position of the rotor are drifting when the comparison of the determined inverter DC power value and the determined power command value is greater than the threshold value.

13. The method of claim 12, comprising:
- turning off pulse width modulation of the inverter circuit and reporting an estimation fault.

14. The method of claim 9, wherein determining whether to turn off the inverter circuit based on the comparison includes:
- determining that a speed and a position of the rotor are within an error range when the comparison of the determined inverter DC power value and the determined power command value is less than the threshold value.

15. A vehicle having a synchronous machine having a stator and a rotor, the vehicle comprising:
- a traction system mechanically coupled to the synchronous machine;
- an inverter circuit configured to be coupled between the stator and a common bus, wherein the common bus is configured to be coupled with an electrical load;
- a controller configured for:
  - determining an inverter DC power value based on a voltage of the common bus and a current of the common bus;
  - determining a power command value based on an estimated rotational speed of the rotor and a commanded torque value;
  - comparing the determined inverter DC power value and the determined power command value to a threshold value; and
  - determining whether to turn off the inverter circuit based on the comparison.

16. The vehicle of claim 15, wherein the controller configured for determining the inverter DC power value based on the voltage of the common bus and the current of the common bus is configured for:
- reconstructing the current of the common bus.

17. The vehicle of claim 16, wherein the controller configured for reconstructing the current of the common bus is configured for:
- determining the current of the common bus based on a gate driver signal and a phase current.

18. The vehicle of claim 15, wherein the controller configured for determining whether to turn off the inverter circuit based on the comparison is configured for:
- determining that a speed and a position of the rotor are drifting when the comparison of the determined inverter DC power value and the determined power command value is greater than the threshold value.

19. The vehicle of claim 18, wherein the controller is configured for:
- turning off pulse width modulation of the inverter circuit and reporting an estimation fault.

20. The vehicle of claim 15, wherein the controller configured for determining whether to turn off the inverter circuit based on the comparison is configured for:
- determining that a speed and a position of the rotor are within an error range when the comparison of the determined inverter DC power value and the determined power command value is less than the threshold value.

* * * * *